(12) United States Patent
Ajmera et al.

(10) Patent No.: US 11,159,360 B2
(45) Date of Patent: Oct. 26, 2021

(54) DYNAMIC STATISTICS CORRELATION FOR COMPUTING RESOURCES IN A MULTI-TENANT ENVIRONMENT

(71) Applicant: Cisco Technology, Inc., San Jose, CA (US)

(72) Inventors: Shrey Ajmera, Milpitas, CA (US); Praveen Ravi Kumar, Fremont, CA (US); Sai Krishna Nallapaneni, San Jose, CA (US); Ravi Nag Chamarthy, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/296,753

(22) Filed: Mar. 8, 2019

(65) Prior Publication Data

US 2020/0228391 A1 Jul. 16, 2020

Related U.S. Application Data

(60) Provisional application No. 62/792,501, filed on Jan. 15, 2019.

(51) Int. Cl.
*H04L 12/24* (2006.01)
*G06F 16/901* (2019.01)
*H04L 12/26* (2006.01)

(52) U.S. Cl.
CPC .......... *H04L 41/06* (2013.01); *G06F 16/9024* (2019.01); *H04L 41/0681* (2013.01); *H04L 41/142* (2013.01); *H04L 43/0817* (2013.01)

(58) Field of Classification Search
CPC ......... H04L 41/06; H04L 41/12; H04L 41/22; H04L 41/0806; H04L 41/0823; H04L 41/5054; H04L 43/08; H04L 43/10; H04L 43/0823; H04L 43/0829; H04L 43/0894; H04L 41/142; H04L 41/0681; H04L 43/0817; H04L 67/22; H04L 12/2803; H04L 12/24; H04L 12/26; G06F 16/9024; G06F 16/9027; G06F 16/901
USPC ....................................................... 709/223
See application file for complete search history.

(56) References Cited

U.S. PATENT DOCUMENTS

| | | | | |
|---|---|---|---|---|
| 7,020,696 B1* | 3/2006 | Perry | ................... | H04L 41/0856 709/217 |
| 7,266,595 B1* | 9/2007 | Black | ................... | H04L 41/0806 709/223 |
| 2005/0182975 A1* | 8/2005 | Guo | ................... | H04W 52/0216 713/300 |
| 2011/0225277 A1* | 9/2011 | Freimuth | ............ | G06F 9/45558 709/223 |

(Continued)

*Primary Examiner* — James N Fiorillo
(74) *Attorney, Agent, or Firm* — Merchant & Gould P.C.

(57) ABSTRACT

A method and system for managing resources of a computer network may be provided. A first request to detect a first event in a computer network may be received. A first element of the first event may be detected at a first computing resource of the computer network. After detecting the first element of the first event at the first computing resource, a second computing resource of the computer network may be determined. First data corresponding to the first event from the first computing resource may be provided to the second computing resource. A second element of the first event may be detected at the second computing resource.

20 Claims, 5 Drawing Sheets

(56) References Cited

U.S. PATENT DOCUMENTS

| | | | | |
|---|---|---|---|---|
| 2012/0076153 | A1* | 3/2012 | Manzella | H04L 49/101 |
| | | | | 370/419 |
| 2013/0346592 | A1* | 12/2013 | Kamble | H04L 43/0894 |
| | | | | 709/224 |
| 2014/0192646 | A1* | 7/2014 | Mir | H04L 47/12 |
| | | | | 370/235 |
| 2017/0031704 | A1* | 2/2017 | Sudhakaran | G06F 16/128 |
| 2017/0063905 | A1* | 3/2017 | Muddu | H04L 63/1416 |
| 2017/0155672 | A1* | 6/2017 | Muthukrishnan | H04L 63/1425 |
| 2018/0212818 | A1* | 7/2018 | Ide | H04L 43/0823 |
| 2018/0227244 | A1* | 8/2018 | Zhang | H04L 47/827 |
| 2018/0302277 | A1* | 10/2018 | Shimamura | H04L 41/0806 |
| 2019/0095491 | A1* | 3/2019 | Bhattacharjee | G06F 16/2433 |
| 2019/0114247 | A1* | 4/2019 | Chen | H04L 41/142 |
| 2019/0138638 | A1* | 5/2019 | Pal | G06F 9/4881 |
| 2019/0220298 | A1* | 7/2019 | Jiao | G06F 9/45558 |
| 2019/0356549 | A1* | 11/2019 | Mehdi | H04L 41/0823 |
| 2020/0067783 | A1* | 2/2020 | Kamath | H04L 41/142 |
| 2020/0128047 | A1* | 4/2020 | Biswas | H04L 63/102 |

\* cited by examiner

DYNAMIC STATISTICS CORRELATION FOR COMPUTING RESOURCES IN A MULTI-TENANT ENVIRONMENT

RELATED APPLICATION

Under provisions of 35 U.S.C. § 119(e), Applicant claims the benefit of U.S. Provisional Application No. 62/792,501 filed Jan. 15, 2019, which is incorporated herein by reference.

TECHNICAL FIELD

The present disclosure relates statistics correlation in multi-tenant environment.

BACKGROUND

Cloud based computing is a model that allows access to a shared pool of configurable computing resources. Cloud based computing and storage solutions provide users and enterprises with various capabilities to store and process their data in third-party data centers. It shares resources to achieve coherence and economies of scale.

Cloud computing also focuses on maximizing the effectiveness of the shared resources. Cloud resources are usually not only shared by multiple users, but are also dynamically reallocated per demand. This can work for allocating resources to users. For example, a cloud computer facility that serves European users during European business hours with a specific application (e.g., e-mail) may reallocate the same resources to serve North American users during North American business hours with a different application (e.g., a web server). This approach helps maximize computing power use while reducing the overall resources cost by using, for example, less power, air conditioning, rack space, to maintain the system. However, managing such shared resources is a challenge.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
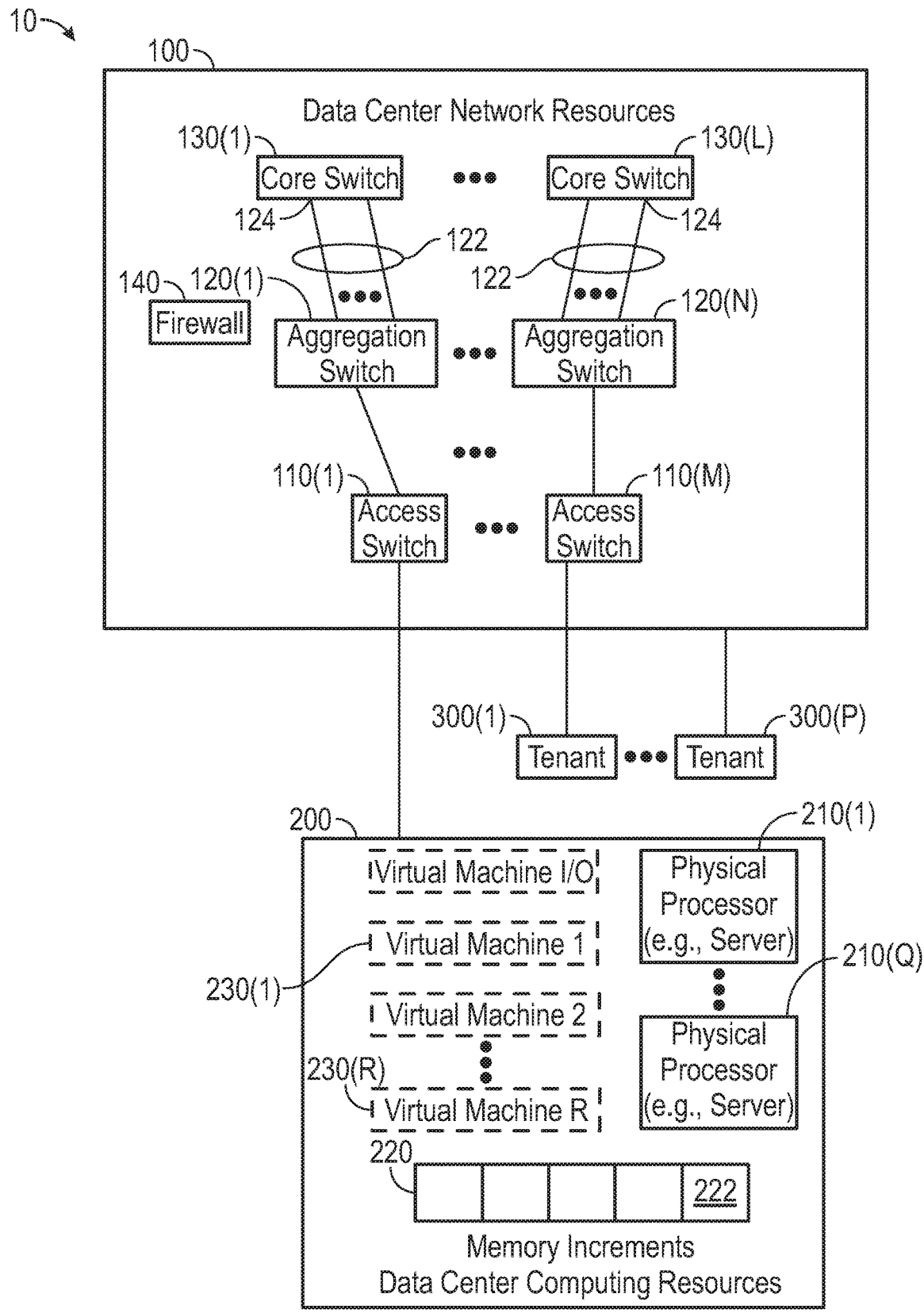
FIG. 1 is an example of a block diagram showing a data center environment.

Methods and systems for managing computing resources is provided. A first request to detect a first event in a computer network may be received. A first element of the first event may be detected at a first computing resource of the computer network. After detecting the first element of the first event at the first computing resource, a second computing resource of the computer network may be determined. First data corresponding to the first event may be provided from the first computing resource to the second computing resource. A second element of the first event may be determined to be detected at the second computing resource. After detection of the second element, the first data and second data corresponding to the second element may be provided to a first user.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In a data center, fabric of network switches or servers are controlled by policies from a set of controllers. Endpoints, which may include switches or servers, statistics gets collected and correlated with the policy, and is used for configuring the endpoints for extracting useful information. For example, network configuration for a first application may be deployed through policies on a set of switches (for example, three switches). On each of the three switches, a virtual local area network (VLAN)-1 may be deployed on Ethernet port 1/1, Ethernet port 1/2 and Ethernet port 1/3. This may mean that the behavior of the first application may be dependent on the behavior of VLAN-1 and the Ethernet ports 1/1, 1/2, and 1/3 that are present on three different switches. For extracting behavioral information at a first application level, statistics for VLAN-1 and the Ethernet ports 1/1, 1/2, and 1/3 may be collected and correlated with the policy used for configuring the first application.

Statistics correlation may be complex and the collected statistics may travel through multiple internal states between a source and a target. Therefore, in known data centers, a standard statistics correlation logic (also referred to as one-size fits all correlation logic) may be built into without providing control to a user. This may lead to undesirable outcomes. For example, a bug in the correlation logic may require the correlation logic to be fixed. Moreover, different end users (or tenants) may not be able to specify different correlation rules or modify or delete a correlation rule based on a requirement. As a result, computing resources may be wasted for calculating something that may not be needed by the user. For example, a first tenant may want statistics correlation only for a traffic that gets denied versus a second tenant who may want statistics for both allowed and denied traffic.

Embodiments of the disclosure may provide statistics correlation using user defined policies for example. Thus, embodiments of the disclosure may provide, a user, fine-grained control over the correlation logic, and dynamically running the correlation logic on real-time data.

Moreover, modularity may be provided with respect to the correlation logics. For example, embodiments of the disclosure may allow a user to disable or patch the correlation logics as needed. In addition, embodiments of the disclosure may provide the ability to personalize the correlation logics. For example, a first user may be able to collect statistics only for traffic that gets denied and a second user may be able to collect statistics for both allowed and denied traffic by personalizing the correlation logics. Another aspect may include improved computing resource usage. For example, allowing a user to personalize the correlation logics to collect desirable statistics may result in saving of computing resources, (for example, processing power and memory). Furthermore, embodiments of the disclosure may provide statistics in real-time, which may be useful to a user.

Each tenant of a computer network, consistent with embodiments of the disclosure, may be allowed to create a correlation logic (i.e., correlation policy). The correlation policy may be represented as a graph. During the statistics collection, graph edges that satisfy a policy dependency may be traversed and executed. No statistics, for example, may be generated for a tenant that did not create a correlation policy. A pseudo code for an example correlation policy may include:

```
<tenant name TenantA>
<stats>
<rule name myCorrelationRule>
<For a class NetworkGroup statsTarget true/>
<For b class Vlan fetchUsing a.association />
<For c class I1Interface fetchUsing b.children />
<condition expression 'a.Name == nginx && b.ID == vlan-2 && c.ID == eth1/10'
/>
</rule>
</stats>
</tenant>.
```

In the pseudo code, "Rule" may represent a correlation policy (e.g., a graph construct), "For" may represent a vertex in the graph, and "class" may represent an endpoint type. Moreover, "a", "b", "c" may represent aliases for the vertices. The aliases may be used for referencing corresponding vertices in the rest of the policy definition. For example, "fetchUsing", in the pseudo code, may represent an edge in the graph and may link a first vertex with a second vertex in the graph. A value of "fetchUsing" may represent an operation to fetch instances of a target vertex from a source vertex. The value of "fetchUsing" may change from one system to another depending on the way data is organized.

For example, "statsTarget", may represent a target where the collected statistical data may be reported. In the pseudo code, "NetworkGroup" may be marked as a target. Therefore, statistical data collected from "Interface" and "vlan" endpoints may be reported onto the "NetworkGroup".

In addition, "condition" may represent filters for the correlation. The correlation may be executed if the filter returns true. In the pseudo code, the correlation may be executed for a "NetworkGroup" called "nginx" and a VLAN called "vlan-2" and port interface eth1/10. If no condition is specified, the correlation may be executed for each "NetworkGroups" and for each VLANS deployed for each "NetworkGroups".

In example embodiments, the correlation policy may be provided as a directed graph construct, where vertices may represent types of endpoints to be included in the correlation determination. A vertex in the graph may not represent an actual instance of an endpoint. Hence, if there are multiple instances of that endpoint type, then the correlation logic may run multiple times (e.g., once per endpoint instance). Edges of the graph may represent a path to traverse from a first type endpoint to a second type endpoint. The process may react to statistical data being generated for endpoints. For example, on receiving a first event for a first endpoint type, the process may find a source vertex representing that the first endpoint type and starts parsing edges originating from the source vertex to determine a target vertex. While parsing the edges, the process may also carry the statistical data from the source vertex to the target vertex.

For example, a hypothetical graph may include three vertices v-1, v-2, and v-3. Vertex v-1 of the hypothetical graph may represent a policy construct called "NetworkGroup" for a web application called "nginx", vertex v-2 may represent a switch endpoint of type vlan, and vertex v-3 may represent another switch endpoint of type port. Moreover, in the hypothetical graph a first edge e-1 from vertex v-1 to vertex v-2 may represent an action to fetch vlans deployed for "nginx". A first reverse edge e-2 from vertex v-2 to vertex v-1 may represent an action to fetch the "networkGroup" from the vlans. A second edge e-3 from vertex v-2 to vertex v-3 may represent an action to fetch ports deployed on the vlan and a second reverse edge e-4 may represent an action to fetch the vlan deployed on the ports. In the hypothetical graph, if the "NetworkGroup" for the "nginx" is deployed on two switches (e.g., switch-1 and switch-2), there may be two vlans in that group, vlan-1 deployed on switch-1 and vlan-2 deployed on switch-2. Vlan-1 may be deployed on interfaces eth1/1, eth1/2, and eth1/3 and the Vlan-2 may be deployed on interfaces eth1/11, eth1/12, and eth1/13. When statistics are reported on these interfaces or vlans, the graph may react to those events and forward the statistics onto the network group.

FIG. 1 shows a data center 10 that may provide cloud based services to one or more tenants. Data center 10 may include network resources 100 and computing resources 200. Network resources 100 may include a variety of network components that may be used to supply networked communications between computing resources 200 and one or more tenants at 300. Data center 10 may provide one or services to tenants 300 through the functions of network resources 100 and computing resources 200.

Network resources 100 may include network components including access switches 110(1)-110(M), aggregation switches 120(1)-120(N), core switches 130(1)-130(L), and a firewall component 140. There may be additional components in the network resources 100, but those shown in FIG. 1 are meant to be representative. Each core switch may include multiple ports 124 that connect to a corresponding one of the aggregation switches by corresponding ones of connections 122 shown in FIG. 1. Each aggregation switch 120(1) may be connected to a plurality of access switches, but for simplicity in FIG. 1, a single instance of a connection between an aggregation switch and an access switch is shown.

One or more tenants 300(1)-300(P) connect to network resources 100 in order to receive one or more services provided by data center 10. To this end, computing resources 200 may be connected to network resources 100. Computing resources 200 may include one or more physical processors servers 210(1)-210(Q) and memory 220. Memory 220 may include a plurality of memory increments 222. Memory increments 222 are shown in this manner for illustrative purposes and not as a logical representation of the organization of the memory. The intent for illustrating memory increments 222 is to show how portions of the memory may be allocated to one or more processes executed by one or more of physical processors 210(1)-210(Q). To this end, physical processors 210(1)-210(Q) may execute software for one or more virtual machine processes shown at 230(1)-230(R).

Data center 10 may provide services to tenants 300(1)-300(P) by executing appropriate ones of virtual machines 230(1)-230(R). Data and controls may flow between tenants 300(1)-300(P) and computing resources 200 via network resources 100.

Figure 2:
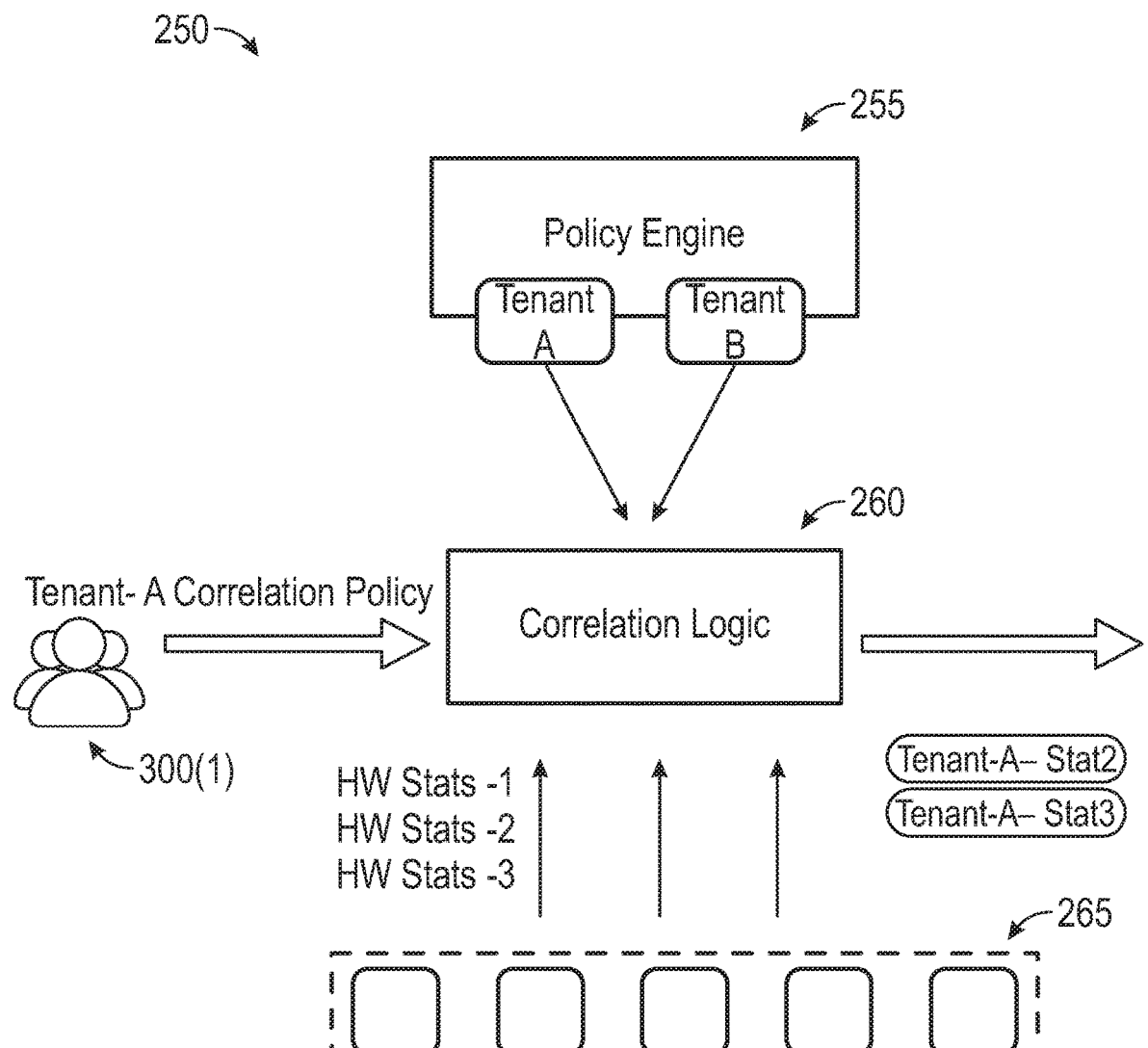
FIG. 2 is an example of a block diagram showing statistics correlation for computing resources.

FIG. 2 is an example illustration of a system 250 for an example of a block diagram showing statistic correlation for computing resources. As shown in FIG. 2, system 250 includes a policy engine 255, a correlation logic 260, and endpoints 265. Tenant-A 300(1) (also referred to as a first tenant) may create a correlation policy. The correlation policy provided by tenant-A 300(1) may be provided to policy engine 255. Policy engine 255 may store the correlation policy received from tenant-A 300(1). In addition, policy engine 255 may create a graph for the correlation policy. Policy engine 255 may provide the graph to correlation logic 260. Correlation logic 260 may then execute the correlation policy and collect statistical information from one or more endpoints 265 (also referred to as computing resources). Correlation logic 260 then may provide the collected statistical information to a target device. Tenant-A 300(1) may receive/view the collected statistical information in real time and dynamically alter the correlation policy. The altered correlation policy may then be provided to policy engine 255 in real time to be executed by correlation logic 260.

Figure 3:
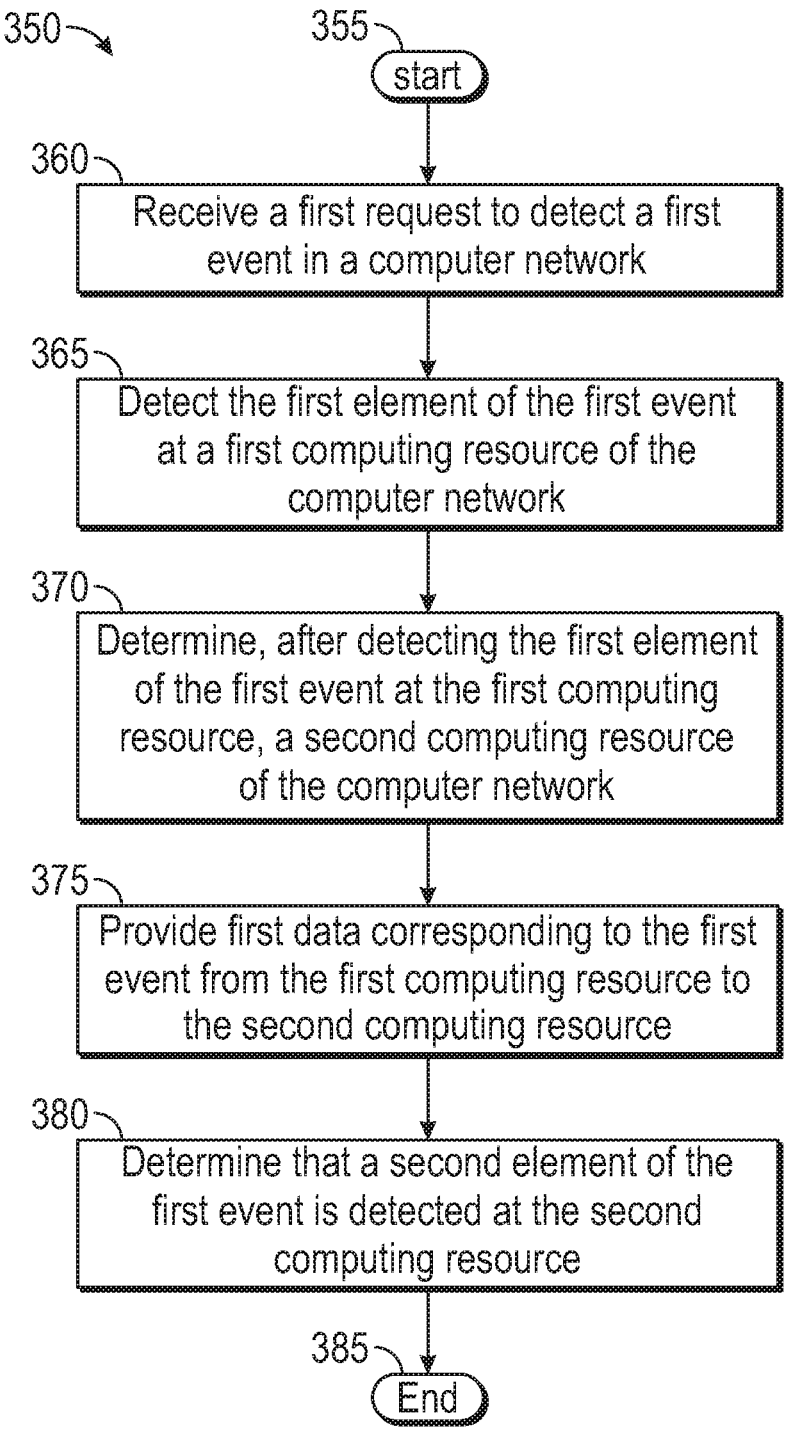
FIG. 3 is a flow chart of a method for providing statistical data for an event.

FIG. 3 is a flow chart setting forth the general stages involved in a method 350 consistent with embodiments of the disclosure for providing statistical data corresponding to a correlation policy for an event. Method 350 may be implemented using a computing device 500 as described in more detail below with respect to FIG. 5. Ways to implement the stages of method 350 will be described in greater detail below.

Method 350 may begin at starting block 355 and proceed to stage 360 where a first request to detect a first event in a computer network may be received. The first request may be received from first tenant 300(1). For example, first tenant 300(1) may create a correlation policy to detect a first event in data center 10. In example embodiments, event may include fault, and may semantically represent something that is not working in the computer network and may have a remediation process associated with it. In addition, an event may include statistical data event. In example embodiments, the correlation policy, thus may be an event correlation policy, a fault correlation policy, a statistical event correlation policy, a combined event and fault correlation policy, a combined event and statistical correlation policy, a combined fault and statistical correlation policy.

In example embodiments, the first event may include one or more elements. For example, the first event may include a first element (which may be a sub-event) to be detected at a first endpoint. The first event may further include a second element (which may be another sub-event) which may be detected at a second endpoint only after detection of the first element at the first endpoint. For example, the first event may include a first element comprising detecting fault at a first Ethernet port of a first switch. Upon detection of the fault, the first event may require to determine a VLAN attached to the first Ethernet port at fault. These correlations between the elements of the first event may be represented as a correlation graph which may include the elements as vertices and correlation logics as edges connecting the vertices. The endpoints may be provided as attachments to the vertices where the corresponding element may need to be detected.

From stage 360, where a first request to detect a first event in a computer network is received, method 350 may advance to stage 365 where the first element of the first event is detected. For example, the first element may be detected at a first computing resource of the computer network. In example embodiments, the first element may be detected by observing for one or more conditions regarding the first computing resource defined in the first element.

Once the first element of the first event is detected in stage 365, method 350 may continue to stage 370 where the second computing resource is determined. The second computing resource is determined from the first event. For example, the second element may be determined by traversing edges from a vertex representing the first element in the correlation graph. In another example, the second element may be determined by traversing edges from a vertex corresponding to the first component in a component graph representing the computer network.

After determining the second computing resource in stage 370, method 350 may proceed to stage 375 where first data corresponding to the first computing resource is provided to the second computing resource. For example, upon detecting the first element at the first computing resource, statistical information related to the first element may be collected from the first computing resource. In example embodiments, the statistical information to be collected may be defined in the first element or first event. The statistical information to be collected may be defined by first tenant 300(1) during creation of first event or dynamically after the creation and during the execution. This collected statistical information may then be provided to the second computing resource as the first data.

Once, the first data corresponding to the first computing resource is provided to the second computing resource at stage 375, method 350 may proceed to stage 380 where it may be determined whether the second element of the first event is detected at the second computing resource. The second element may be detected by observing for one or more conditions regarding the second computing resource defined in the second element. If the second element is detected at the second computing resource, statistical information related to the second element may be collected from the second computing resource. In example embodiments, the statistical information to be collected from the second computing resource may be defined in the second element or first event. The statistical information to be collected may be defined by first tenant 300(1) during creation of first event or dynamically after the creation or during the execution. This collected statistical information may then be provided to a target computing resource as the second data along with the first data. If the second element is not detected at the second computing resource, the first data may be provided to a dedicated data store for collection event data. Method 350 may then end at stage 385.

Figure 4:
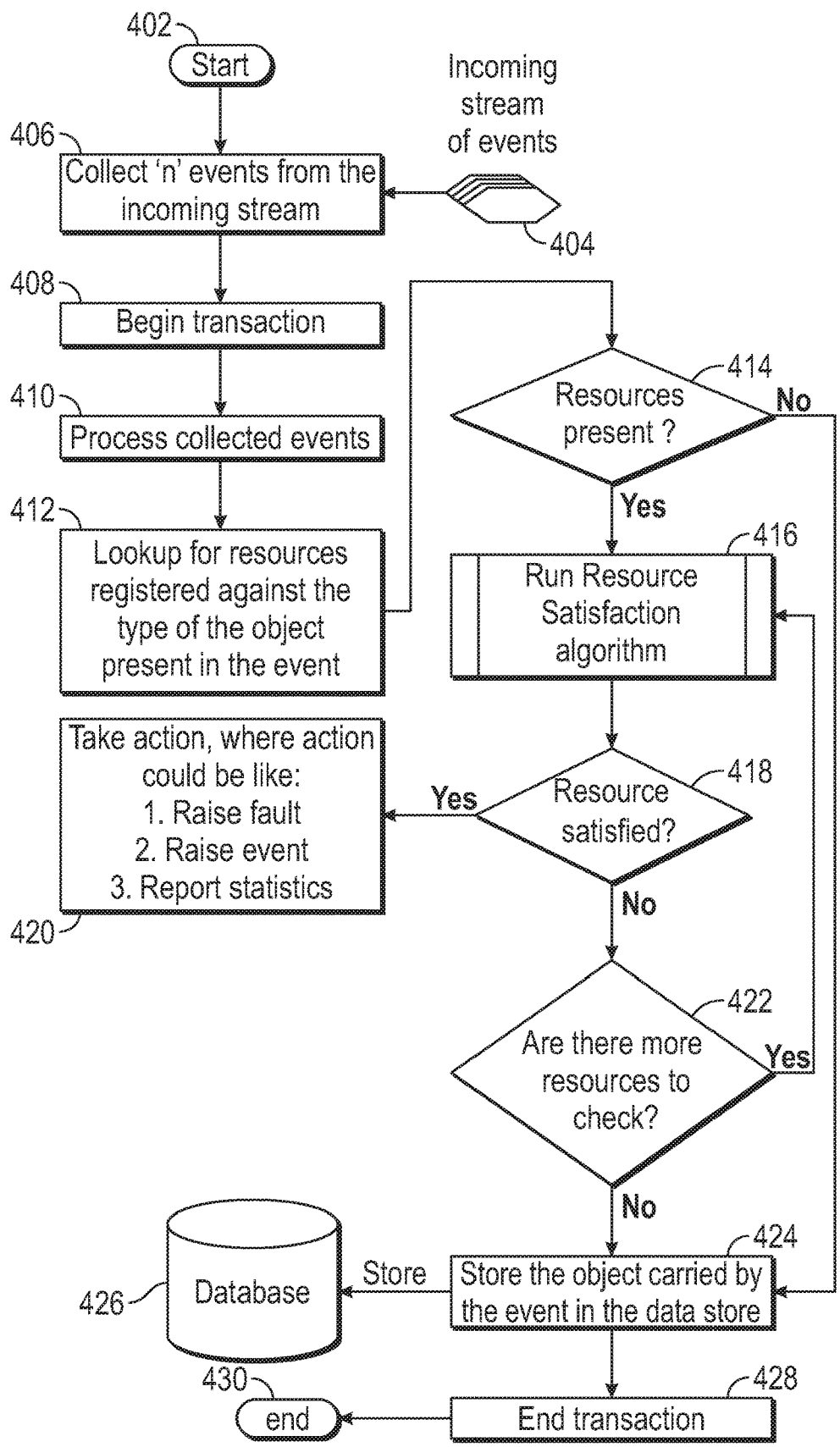
FIG. 4 is a flow chart of another method for providing statistical data for an event.

FIG. 4 is a flow chart setting forth the general stages involved in another method 400 consistent with embodiments of the disclosure for providing statistical data corresponding to a correlation policy for an event. Method 400 may be implemented using a computing device 500 as described in more detail below with respect to FIG. 5. Ways to implement the stages of method 400 will be described in greater detail below.

Method 400 may begin at starting block 402 and proceed to stage 404 where incoming stream of events may be received. For example, the events may be generated by tenants 300 and may be received as incoming stream of events at policy engine 255. After receiving the incoming events at stage 404, method 400 may proceed to stage 406 where one or more events (also referred to as 'n' events) may be collected from the received incoming stream. For example, the 'n' events may be collected on policy engine 255.

Once having collected the 'n' events at stage 406, method 400 may proceed to stage 408 where transactions may begin. For example, transaction may begin for events related for each of the correlation policies defined by one or more tenants 300. After beginning of the transactions at stage 408, method 400 may proceed to stage 410 where collected events may be processed. For example, the collected events may be processed to create a graph for each tenant correlation policy.

Once processing the collected events at stage 410, method 400 may proceed to stage 412 where lookup is performed for computing resources registered against the type of object present in the events. The lookup may be performed in a directed graph representing the computing resources of data center 10.

After performing the lookup for computing resources at stage 412, method 400 may proceed to stage 414 where it may be determined if the computing resource is present. If the computing resource is found at stage 414 method may proceed to stage 416 where a resource satisfaction algorithm is executed on the computing resource. The resource satisfaction algorithm may correspond to an element of the correlation policy.

Once having executed the resource satisfaction algorithm at stage 416, method 400 may proceed to stage 418 where it may be determined if the computing resource is satisfied. For example, it may be determined if an element of the event in the correlation policy is satisfied by the computing resource. If the computing resource is determined to be satisfied at stage 418, method 400 may proceed to stage 420 where one or more actions are taken. The actions may include raising a fault, raising an event, and reporting statistics.

If the computing resource is determined to be not satisfied at stage 418, method 400 may proceed to stage 422 where it is determined if there are any more computing resources to be determined. If it is determined that there are more computing resources to be determined at stage 422, method 400 may loop back to stage 416. However, if it is determined that there are not any more computing resources to be determined at stage 422, method 400 may proceed to stage 424 where an object carried by the event in the data store may be collected.

After collecting the object at stage 424, method 400 may proceed to stage 426 where the collected object may be stored in a database. Once having stored the collected object at stage 426, method 400 may proceed to stage 428 where the transaction may end. If there are more transactions to be executed, method 400 may loop back to stage 406. If there are no transactions left, method 400 may end at stage 430.

Figure 5:
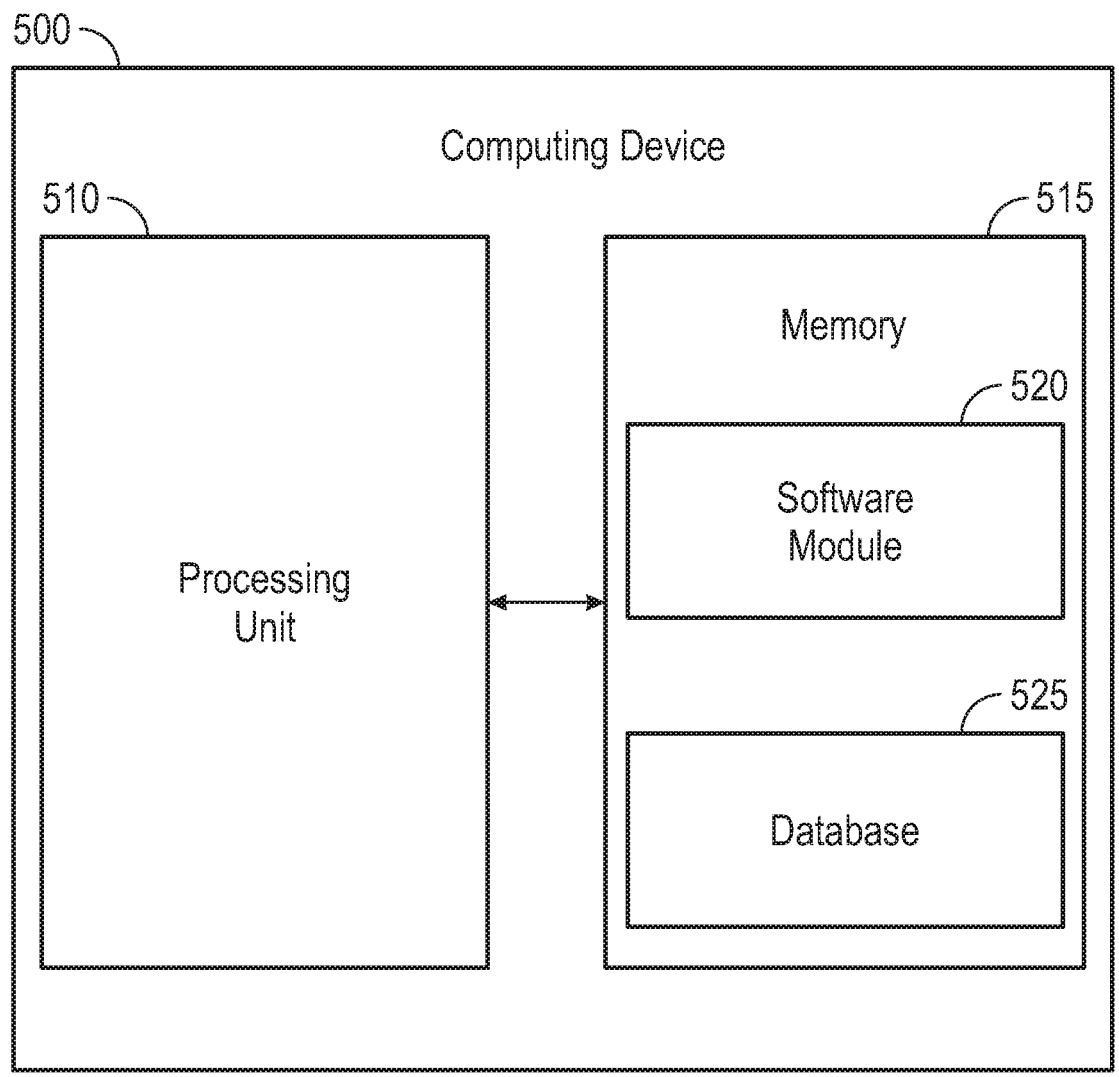
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing location-based, context-aware challenge-response authentication, including for example, any one or more of the stages from method 350 and method 400 described above with respect to FIG. 3 and FIG. 4 respectively.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multi-processor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

According to an embodiment, a method of managing resources includes: receiving a first request to detect a first event in a computer network; detecting a first element of the first event at a first computing resource of the computer network; determining, after detecting the first element of the first event at the first computing resource, a second computing resource of the computer network; providing first data corresponding to the first event from the first computing resource to the second computing resource; and determining that a second element of the first event is detected at the second computing resource. The first event may include the first element to be detected at the first computing resource, the second element to be detected at the second computing resource, and a first correlation between the first computing resource and the second computing resource.

According to example embodiments, the method further includes determining a first vertex corresponding to the first computing resource in a directed graph representing the computer network, the directed graph having a plurality of vertices connected by a plurality of edges, each of the plurality of vertices representing a same type of computing resources and each of the plurality of edges representing a correlation between a pair of vertices. Moreover, a second vertex corresponding to the second computing resource may be determined by traversing a first edge originating from the first vertex, the first edge representing the first correlation. In addition, a first node of the first vertex where the first element of the first event is detected may be determined, the first vertex including a plurality of nodes representing a plurality of computing resources of the same type.

In example embodiments, a system includes a memory storage and a processing unit coupled to the memory storage. The processing unit is operative to: receive a first request to detect a first event in a computer network; determine a first endpoint of the computer network where a first element of the first event occurred, wherein the first endpoint is associated with a first element of the first event; determine a second endpoint of the computer network based on a first correlation between the first endpoint and the second endpoint; provide first data corresponding to the first element from the first endpoint to the second endpoint; determine that a second element of the first event is detected at the second endpoint; and provide, in response to determining that the second element is detected at the second endpoint, the first data corresponding to the first element and second data corresponding to the second element to a first user.

According to example embodiments a non-transitory computer readable medium that stores a set of instructions which when executed by a processing unit, cause the processing unit to: receive a first request to detect a first event in a computer network; determine that a first element of the first event is detected at a first endpoint of the computer network; and in response to determining that the first element of the first event is detected at the first endpoint: determine a second endpoint in the computer network, provide first data corresponding to the first event from the first endpoint to the second endpoint, determine that a second element of the first event is detected at the second endpoint, and provide, in response to determining that the second element is detected at the second endpoint, the first data corresponding to the first element and second data corresponding to the second element to a first user.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 105 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method of managing resources, the method comprising:
   receiving a first request to detect a first event in a computer network;
   detecting a first element of the first event at a first computing resource of the computer network, wherein the detection of the first element indicates the presence of one or more conditions regarding the first computing resource, as defined in the first element by a tenant utilizing the computer network;

determining, after detecting the first element of the first event at the first computing resource, a second computing resource of the computer network, wherein determining the second computing resource of the computer network comprises:

determining a first vertex corresponding to the first computing resource in a directed graph representing the computer network, and determining a second vertex corresponding to the second computing resource by traversing a first edge originating from the first vertex, the first edge representing a first correlation between the first computing resource and the second computing resource, wherein the first correlation between the first computing resource and the second computing resource is received from the tenant in the first request;

providing first data corresponding to the first event from the first computing resource to the second computing resource, wherein providing the first data corresponding to the first event from the first computing resource to the second computing resource comprises:

collecting statistical information to be collected related to the first element at the first computing resource, wherein the statistical information to be collected is defined in the first element of the first event, and providing the statistical information collected at the first element to the second computing resource;

determining that a second element of the first event is detected at the second computing resource, wherein the detection of the second element indicates the presence of one or more conditions regarding the second computing resource, as defined by the tenant, and the second element is only detected at the second computing resource after the detection of the first element at the first computing resource; and provide, in response to determining that the second element is detected at the second computing resource, the first data corresponding to the first element and second data corresponding to the second element to the tenant.

2. The method of claim 1, further comprising:
determining a third element of the first event and a second correlation between the second computing resource and a third computing resource, the third element to be detected at the third computing resource; and
determining that a second edge originating from the second computing resource and representing the second correlation exists.

3. The method of claim 2, further comprising:
providing, in response to determining that the second edge exists, the first data and second data corresponding to the second element to the third computing resource; and
providing, by the third computing resource, the first data, the second data, and third data corresponding to the third element to a first user.

4. The method of claim 2, further comprising:
in response to determining that the second edge does not exist, providing the first data and second data corresponding to the second element to a data storage operative to collect event data for future event analysis.

5. The method of claim 1, wherein receiving the first request to detect the first event comprises receiving the first event comprising the first element to be detected at the first computing resource, the second element to be detected at the second computing resource, and the first correlation between the first computing resource and the second computing resource.

6. The method of claim 1, further comprising:
determining a first node of the first vertex where the first element of the first event is detected, wherein the first vertex comprises a plurality of nodes representing a plurality of computing resources of the same type.

7. The method of claim 1, further comprising:
in response to determining that the second element is detected at the second computing resource of the computer network, providing, the first data corresponding to the first element and second data corresponding to the second element to a first user.

8. The method of claim 1, further comprising:
in response to determining that the second element is not detected at the second computing resource of the computer network, providing, the first data corresponding to the first element to a data storage operative to collect event data for future event analysis.

9. The method of claim 1, wherein receiving the first request to detect the first event comprises receiving a request to detect a fault data at one or more computing resources.

10. A system comprising:
a memory storage; and
a processing unit coupled to the memory storage, wherein the processing unit is operative to:
receive a first request to detect a first event in a computer network;
determine a first endpoint of the computer network where a first element of the first event occurred, wherein the first endpoint is associated with a first element of the first event, and the first element indicates the presence of one or more conditions regarding a first computing resource by a tenant utilizing the computer network;
determine a second endpoint of the computer network based on a first correlation between the first endpoint and the second endpoint, wherein the processing unit being operative to determine a second computing resource of the computer network comprises the processing unit being operative to:
determine a first vertex corresponding to the first computing resource in a directed graph representing the computer network, and
determine a second vertex corresponding to the second computing resource by traversing a first edge originating from the first vertex, the first edge representing the first correlation between the first computing resource and the second computing resource, wherein the correlation between the first computing resource and the second computing resource is received from the tenant in the first request;
provide first data corresponding to the first element from the first endpoint to the second endpoint, wherein the processing unit being operative to provide the first data corresponding to the first event from the first computing resource to the second computing resource comprises the processing unit being operative to:
collect statistical information to be collected related to the first element at the first computing resource, wherein the statistical information to be collected is defined in the first element of the first event, and
provide the statistical information collected at the first element to the second computing resource;
determine that a second element of the first event is detected at the second endpoint, wherein the detection of the second element indicates the presence of one or more conditions regarding the second computing resource, as defined by the tenant, and the second element is only detected at the second computing resource after the detection of the first element at the first computing resource; and provide, in response to determining that the second element is detected at the second endpoint, the first data corresponding to the first element and second data corresponding to the second element to a first user.

11. The system of claim 10, wherein the processing unit is further configured to:
determine a first node of the first vertex where the first event is detected, wherein the first vertex comprises a plurality of nodes corresponding to a same type of computing resources.

12. The system of claim 11, wherein the first node comprises a first switch device of the computing network.

13. The system of claim 11, wherein the first node comprises a first Ethernet port of a first switch device and a second Ethernet port of a second switch device.

14. The system of claim 11, wherein the first vertex comprises one or more virtual area networks of the computing network.

15. A non-transitory computer readable medium that stores a set of instructions which when executed perform a method executed by the set of instructions comprising:
receiving a first request to detect a first event in a computer network;
determining that a first element of the first event is detected at a first endpoint of the computer network, wherein the first element indicates the presence of one or more conditions regarding a first computing resource by a tenant utilizing the computer network; and
determining, in response to determining that the first element of the first event is detected at the first endpoint, a second endpoint in the computer network, wherein determining the second endpoint of the computer network comprises:
determining a first vertex corresponding to the first endpoint in a directed graph representing the computer network, and
determining a second vertex corresponding to the second endpoint by traversing a first edge originating from the first vertex, the first edge representing a first correlation between the first endpoint and the second endpoint, wherein the first correlation between the first endpoint and the second endpoint is received from the tenant in the first request,
providing first data corresponding to the first event from the first endpoint to the second endpoint, wherein the first endpoint is associated with a first computing resource and the second endpoint is associated with a second computing resource, and providing the first data corresponding to the first event from the first computing resource to the second computing resource comprises:

collecting statistical information to be collected related to the first element at the first computing resource, wherein the statistical information to be collected is defined in the first element of the first event, and
providing the statistical information collected at the first element to the second computing resource;
determining that a second element of the first event is detected at the second endpoint, wherein the detection of the second element indicates the presence of one or more conditions regarding the second computing resource, as defined by the tenant, and the second element is only detected at the second computing resource after the detection of the first element at the first computing resource; and
providing, in response to determining that the second element is detected at the second endpoint, the first data corresponding to the first element and second data corresponding to the second element to a first user.

16. The non-transitory computer readable medium of claim 15, further comprising:
determining a third element of the first event and a second correlation between the second computing resource and a third computing resource, the third element to be detected at the third computing resource; and
determining that a second edge originating from the second computing resource and representing the second correlation exists.

17. The non-transitory computer readable medium of claim 16, further comprising:
providing, in response to determining that the second edge exists, the first data and second data corresponding to the second element to the third computing resource; and
providing, by the third computing resource, the first data, the second data, and third data corresponding to the third element to a first user.

18. The non-transitory computer readable medium of claim 16, further comprising:
in response to determining that the second edge does not exist, providing the first data and second data corresponding to the second element to a data storage operative to collect event data for future event analysis.

19. The non-transitory computer readable medium of claim 15, wherein the first request comprises the first element to be detected at the first endpoint, the second element to be detected at the second point upon detection of the first element, and the first correlation between the first endpoint and the second endpoint.

20. The non-transitory computer readable medium of claim 15, further comprising:
in response to determining that the second element is detected at the second computing resource of the computer network, providing, the first data corresponding to the first element and second data corresponding to the second element to a first user.

* * * * *